US012620813B2

(12) United States Patent
Xu et al.

(10) Patent No.: US 12,620,813 B2
(45) Date of Patent: May 5, 2026

(54) INVERTER AND CONTROL METHOD FOR INVERTER

(71) Applicant: Huawei Digital Power Technologies Co., Ltd., Shenzhen (CN)

(72) Inventors: Fei Xu, Shenzhen (CN); Xinyu Yu, Shanghai (CN); Mingquan Zhao, Shanghai (CN); Zisen Qu, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 251 days.

(21) Appl. No.: 18/522,758

(22) Filed: Nov. 29, 2023

(65) Prior Publication Data

US 2024/0178668 A1 May 30, 2024

(30) Foreign Application Priority Data

Nov. 30, 2022 (CN) .......................... 202211518092.3

(51) Int. Cl.
H02J 3/48 (2026.01)
H02J 3/38 (2026.01)
H02M 7/5387 (2007.01)

(52) U.S. Cl.
CPC ................ H02J 3/48 (2013.01); H02J 3/381 (2013.01); H02M 7/53871 (2013.01); Y02E 10/56 (2013.01)

(58) Field of Classification Search
CPC ........ H02J 3/48; H02J 3/381; H02M 7/53871; Y02E 10/56
See application file for complete search history.

(56) References Cited

U.S. PATENT DOCUMENTS

2019/0305551 A1* 10/2019 Ley .......................... H02J 3/388

FOREIGN PATENT DOCUMENTS

| CN | 104578857 | A | | 4/2015 | | |
| CN | 105552968 | A | * | 5/2016 | ............... | G05F 1/67 |
| CN | 105552968 | B | | 4/2018 | | |
| CN | 113890115 | A | * | 1/2022 | ................ | H02J 3/48 |

OTHER PUBLICATIONS

CN105552968 Translation (Year: 2016).*
CN113890115 Translation (Year: 2022).*

* cited by examiner

*Primary Examiner* — Crystal L Hammond
*Assistant Examiner* — Jennifer C Caulk
(74) *Attorney, Agent, or Firm* — Maier & Maier, PLLC

(57) ABSTRACT

An inverter and a control method for the inverter. The inverter includes a direct current conversion circuit, a direct current bus, an inverter circuit, and a controller. An input end of the direct current conversion circuit is connected to an input end of the inverter, an output end of the direct current conversion circuit is connected to an input end of the inverter circuit through the direct current bus, and an output end of the inverter circuit is connected to an output end of the inverter. The controller obtains a reactive voltage control amount based on actual output active power and reference output active power of the inverter circuit and adjusts an output voltage of the inverter circuit based on the reactive voltage control amount and a reference output voltage.

20 Claims, 9 Drawing Sheets

INVERTER AND CONTROL METHOD FOR INVERTER

CROSS-REFERENCE TO RELATED DISCLOSURES

This application claims priority to Chinese Patent Application No. 202211518092.3, filed on Nov. 30, 2022, which is hereby incorporated by reference in its entirety.

TECHNICAL FIELD

The embodiments relate to the field of power supply technologies, an inverter, and a control method for the inverter.

BACKGROUND

As a penetration rate of new energy power generation gradually increases, a photovoltaic grid-connected inverter is increasingly required to actively provide voltage and frequency support for a power grid.

Currently, the photovoltaic grid-connected inverter may use a network construction control manner based on a virtual synchronous generator. The network construction control manner based on the virtual synchronous generator can actively provide support for the power grid. However, in the network construction control manner based on the conventional virtual synchronous generator, a control speed of output active power of the photovoltaic grid-connected inverter is slow. This limits an application scenario and scope of the photovoltaic grid-connected inverter. Therefore, it is particularly important to implement quick control on the output active power of the photovoltaic grid-connected inverter.

SUMMARY

The embodiments provide an inverter and a control method for the inverter, to quickly control actual output active power of the inverter when the inverter operates in a network construction control manner.

According to a first aspect, the embodiments provide an inverter, and the inverter includes a direct current conversion circuit, a direct current bus, an inverter circuit, and a controller. An input end of the direct current conversion circuit is connected to an input end of the inverter, an output end of the direct current conversion circuit is connected to an input end of the inverter circuit through the direct current bus, and an output end of the inverter circuit is connected to an output end of the inverter. The controller obtains a reactive voltage control amount based on actual output active power and reference output active power of the inverter circuit and adjusts an output voltage of the inverter circuit based on the reactive voltage control amount and a reference output voltage, to quickly control actual output active power of the inverter when the inverter operates in a network construction control manner.

With reference to the first aspect, in a first possible implementation, the controller further obtains an actual bus voltage of the direct current bus when the direct current conversion circuit is in a maximum power point tracking working state and obtains the reference output active power of the inverter circuit based on the actual bus voltage and a reference bus voltage. It may be understood that, because the inverter operates in the network construction control manner, it may be understood that the inverter operates in a voltage source mode. When operating in the voltage source mode, the inverter can track a maximum power point of a photovoltaic string. Therefore, the inverter not only provides voltage and frequency support for an alternating current power grid without a delay, but also effectively provides an energy yield of the inverter.

With reference to the first aspect, in a second possible implementation, when the inverter receives a power scheduling instruction, the controller further determines first power carried in the power scheduling instruction as the reference output active power of the inverter circuit. It may be understood that, while operating in the voltage source mode, the inverter may further implement a fast power scheduling response. Therefore, the inverter not only can provide support and frequency support for the alternating current power grid without a delay, but also can quickly stabilize output power of a photovoltaic module at a non-maximum power point. In this way, output power of the inverter is stable.

With reference to any one of the first aspect to the second possible implementation of the first aspect, in a third possible implementation, the reactive voltage control amount is a q-axis output voltage variation. When the q-axis output voltage variation is greater than 0, the controller adjusts the output voltage of the inverter circuit based on the q-axis output voltage variation and the reference output voltage, to increase the actual output active power of the inverter circuit. It may be understood that the inverter controls the output voltage of the inverter circuit in a manner of superimposing the q-axis output voltage variation that is greater than 0 on the q-axis reference output voltage in the reference output voltage, to quickly increase the actual output active power of the inverter circuit, and provide voltage and frequency support for the alternating current power grid without a delay.

With reference to any one of the first aspect to the second possible implementation of the first aspect, in a fourth possible implementation, the reactive voltage control amount is a q-axis output voltage variation. When the q-axis output voltage variation is less than 0, the controller adjusts the output voltage of the inverter circuit based on the q-axis output voltage variation and the reference output voltage, to decrease the actual output active power of the inverter circuit. It may be understood that the inverter controls the output voltage of the inverter circuit in a manner of superimposing the q-axis output voltage variation that is less than 0 on the q-axis reference output voltage in the reference output voltage, to quickly decrease the actual output active power of the inverter circuit, and provide voltage and frequency support for the alternating current power grid without a delay.

With reference to the third possible implementation of the first aspect or the fourth possible implementation of the first aspect, in a fifth possible implementation, the reference output voltage includes a q-axis reference output voltage component, a d-axis reference output voltage component, and an output voltage reference frequency. The controller obtains a q-axis target output voltage component based on the q-axis reference output voltage component and the q-axis output voltage variation and adjusts the output voltage of the inverter circuit based on the q-axis target output voltage component, the output voltage reference frequency, and the d-axis reference output voltage component, so that the inverter operates in the voltage source mode. In this way, the inverter can provide voltage and frequency support for the alternating current power grid without a delay.

With reference to any one of the first aspect to the second possible implementation of the first aspect, in a sixth possible implementation, the reactive voltage control amount is an output voltage frequency variation. When a q-axis output voltage variation corresponding to the output voltage frequency variation is greater than 0, the controller adjusts the output voltage of the inverter circuit based on the output voltage frequency variation and the reference output voltage, to decrease the actual output active power of the inverter circuit. It may be understood that the inverter controls the output voltage of the inverter circuit by superimposing the output voltage frequency variation on the output voltage reference frequency in the reference output voltage, to quickly adjust the actual output active power of the inverter circuit and provide voltage and frequency support for the alternating current power grid without a delay.

With reference to any one of the first aspect to the second possible implementation of the first aspect, in a seventh possible implementation, the reactive voltage control amount is an output voltage frequency variation. When a q-axis output voltage variation corresponding to the output voltage frequency variation is less than 0, the controller adjusts the output voltage of the inverter circuit based on the output voltage frequency variation and the reference output voltage, to increase the actual output active power of the inverter circuit. It may be understood that the inverter controls the output voltage of the inverter circuit by superimposing the output voltage frequency variation on the output voltage reference frequency in the reference output voltage, to quickly adjust the actual output active power of the inverter circuit and provide voltage and frequency support for the alternating current power grid without a delay.

With reference to the sixth possible implementation of the first aspect or the seventh possible implementation of the first aspect, in an eighth possible implementation, the reference output voltage includes a q-axis reference output voltage component, a d-axis reference output voltage component, and an output voltage reference frequency. The controller obtains an output voltage target frequency based on the output voltage reference frequency and the output voltage frequency variation and adjusts the output voltage of the inverter circuit based on the output voltage target frequency, the q-axis reference output voltage component, and the d-axis reference output voltage component, so that the inverter operates in the voltage source mode. In this way, the inverter can provide voltage and frequency support for the alternating current power grid without a delay.

According to a second aspect, the embodiments provide a control method for an inverter, where the inverter includes a direct current conversion circuit, a direct current bus, and an inverter circuit. An input end of the direct current conversion circuit is connected to an input end of the inverter, an output end of the direct current conversion circuit is connected to an input end of the inverter circuit through the direct current bus, and an output end of the inverter circuit is connected to an output end of the inverter. The method includes: The inverter obtains a reactive voltage control amount based on actual output active power and reference output active power of the inverter circuit and adjusts an output voltage of the inverter circuit based on the reactive voltage control amount and a reference output voltage.

With reference to the second aspect, in a first possible implementation, the inverter further obtains an actual bus voltage of the direct current bus when the direct current conversion circuit is in a maximum power point tracking working state and obtains the reference output active power of the inverter circuit based on the actual bus voltage and a reference bus voltage.

With reference to the second aspect, in a second possible implementation, when receiving a power scheduling instruction, the inverter further determines first power carried in the power scheduling instruction as the reference output active power of the inverter circuit.

With reference to any one of the second aspect to the second possible implementation of the second aspect, in a third possible implementation, the reactive voltage control amount is a q-axis output voltage variation. When the q-axis output voltage variation is greater than 0, the inverter adjusts the output voltage of the inverter circuit based on the q-axis output voltage variation and the reference output voltage, to increase the actual output active power of the inverter circuit.

With reference to any one of the second aspect to the second possible implementation of the second aspect, in a fourth possible implementation, the reactive voltage control amount is a q-axis output voltage variation. When the q-axis output voltage variation is less than 0, the inverter adjusts the output voltage of the inverter circuit based on the q-axis output voltage variation and the reference output voltage, to decrease the actual output active power of the inverter circuit.

With reference to the third possible implementation of the second aspect or the fourth possible implementation of the second aspect, in a fifth possible implementation, the reference output voltage includes a q-axis reference output voltage component, a d-axis reference output voltage component, and an output voltage reference frequency. The inverter obtains a q-axis target output voltage component based on the q-axis reference output voltage component and the q-axis output voltage variation and adjusts the output voltage of the inverter circuit based on the q-axis target output voltage component, the output voltage reference frequency, and the d-axis reference output voltage component.

With reference to any one of the second aspect to the second possible implementation of the second aspect, in a sixth possible implementation, the reactive voltage control amount is an output voltage frequency variation. When a q-axis output voltage variation corresponding to the output voltage frequency variation is greater than 0, the inverter adjusts the output voltage of the inverter circuit based on the output voltage frequency variation and the reference output voltage, to decrease the actual output active power of the inverter circuit.

With reference to any one of the second aspect to the second possible implementation of the second aspect, in a seventh possible implementation, the reactive voltage control amount is an output voltage frequency variation. When a q-axis output voltage variation corresponding to the output voltage frequency variation is less than 0, the inverter adjusts the output voltage of the inverter circuit based on the output voltage frequency variation and the reference output voltage, to increase the actual output active power of the inverter circuit.

With reference to the sixth possible implementation of the second aspect or the seventh possible implementation of the second aspect, in an eighth possible implementation, the reference output voltage includes a q-axis reference output voltage component, a d-axis reference output voltage component, and an output voltage reference frequency. The inverter obtains an output voltage target frequency based on the output voltage reference frequency and the output voltage frequency variation and adjusts the output voltage of the inverter circuit based on the output voltage target frequency, the q-axis reference output voltage component, and the d-axis reference output voltage component.

It should be understood that, for implementations and beneficial effects of the foregoing aspects, reference may be made to each other.

DETAILED DESCRIPTION OF EMBODIMENTS

An inverter may be applicable to different application scenarios, for example, a photovoltaic power supply scenario, an energy storage power supply scenario, or an optical storage hybrid power supply scenario. The following uses the photovoltaic power supply scenario as an example for description.

Figure 1:
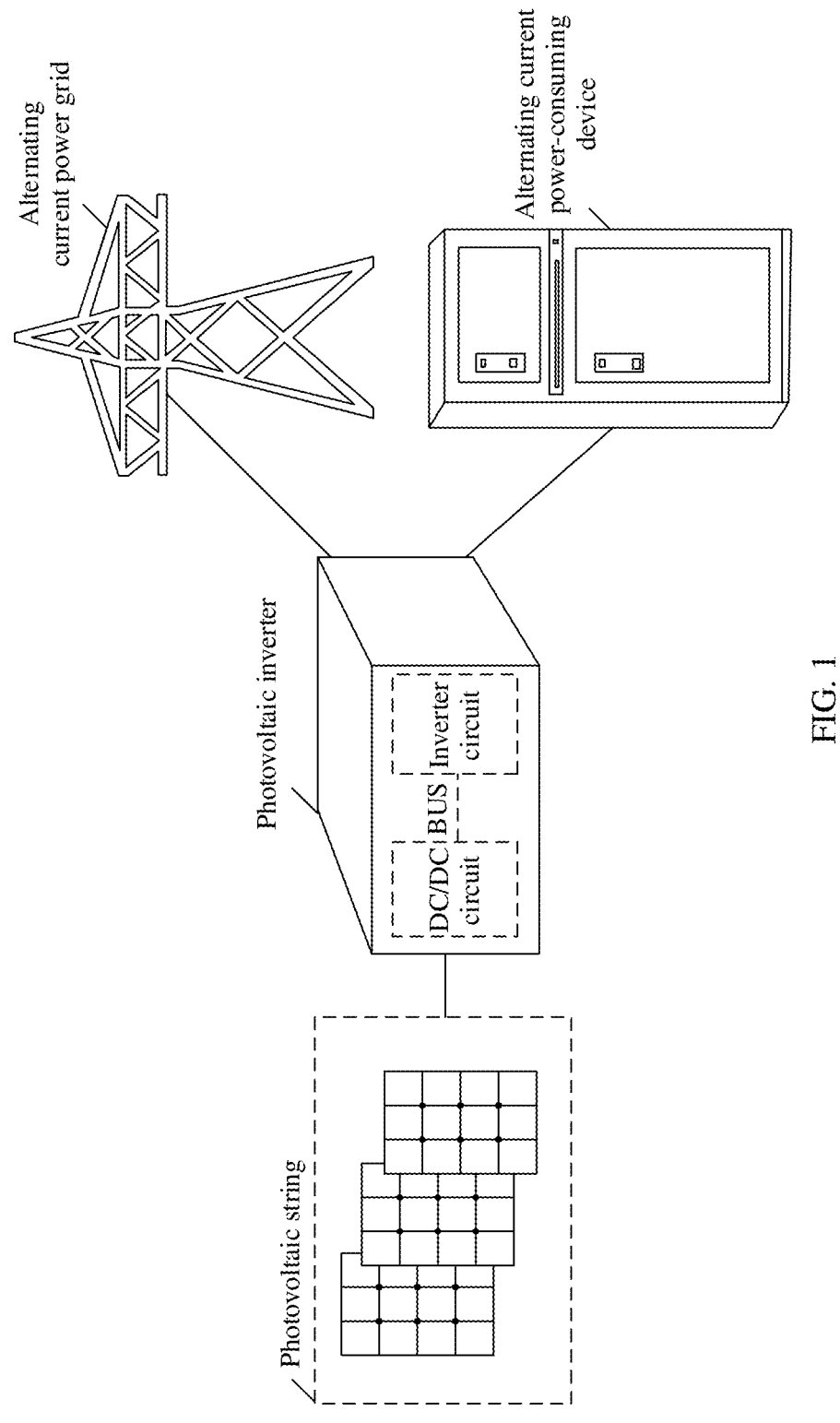
FIG. 1 is a schematic diagram of an application scenario for an inverter.

FIG. 1 is a schematic diagram of an application scenario for an inverter. As shown in FIG. 1, in a photovoltaic power supply scenario, the inverter may be a photovoltaic inverter. An input end of the photovoltaic inverter is connected to a photovoltaic module, and an output end of the photovoltaic inverter is connected to an alternating current power grid or an alternating current power-consuming device. The photovoltaic inverter includes a direct current/direct current (DC/DC) circuit, a direct current bus BUS, and an inverter circuit. An input end of the DC/DC circuit is connected to the input end of the photovoltaic inverter, an output end of the DC/DC circuit is connected to an input end of the inverter circuit through the direct current bus BUS, and an output end of the inverter circuit is connected to the output end of the photovoltaic inverter. After the photovoltaic inverter starts to operate, the photovoltaic inverter performs direct current conversion on, through the DC/DC circuit, a direct current generated by a photovoltaic string connected to the input end of the photovoltaic inverter, and then outputs a direct current obtained through the direct current conversion to the input end of the inverter circuit through the direct current bus BUS. Then, the photovoltaic inverter obtains actual output active power of the inverter circuit, obtains a reactive voltage control amount based on reference output active power and the actual output active power of the inverter circuit, and adjusts an output voltage of the inverter circuit based on the reactive voltage control amount and a reference output voltage, to invert, to an alternating current, the direct current on which direct current conversion is performed and that is input from the input end of the inverter circuit. In this way, the photovoltaic inverter can supply power to an alternating current load (for example, the alternating current power grid or the alternating current power-consuming device). It may be understood that the photovoltaic inverter quickly adjusts an included angle between an output voltage vector of the inverter circuit and a voltage vector of the alternating current power grid in an output voltage control manner of superimposing the reactive voltage control amount on the reference output voltage, so that actual output active power of the inverter when the inverter operates in a network construction control manner can be quickly controlled. The foregoing is merely an example of the application scenario for the inverter and is not exhaustive. The application scenario is not limited.

With reference to FIG. 2 to FIG. 9, the following describes an example of a working principle of the inverter.

Figure 2:
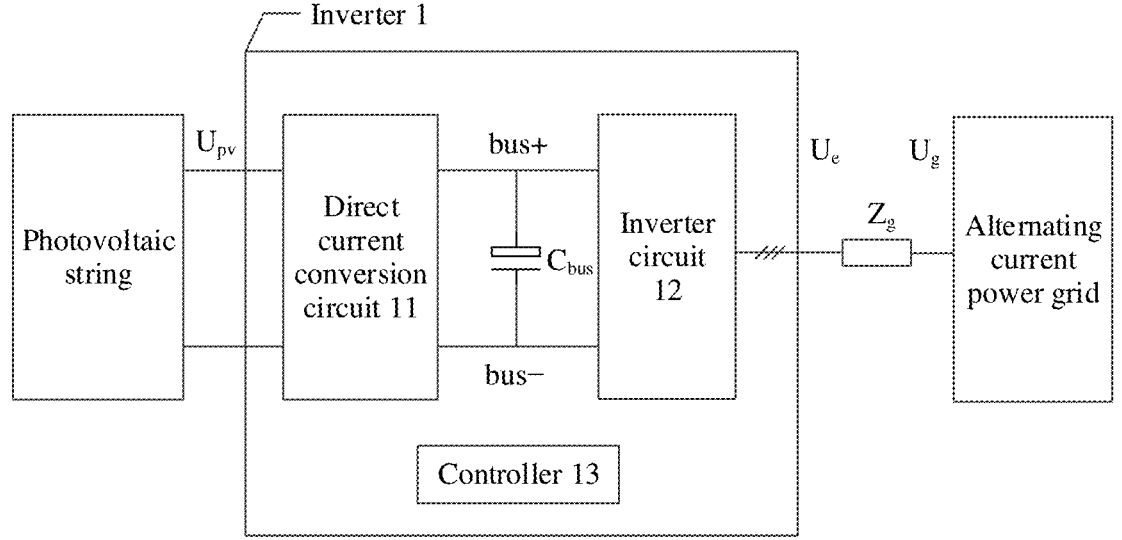
FIG. 2 is a schematic diagram of a structure of an inverter.

FIG. 2 is a schematic diagram of a structure of an inverter. As shown in FIG. 2, an input end of an inverter 1 is connected to a photovoltaic string, and an output end of the inverter 1 is connected to an alternating current power grid through power grid impedance $Z_g$. The inverter 1 includes a direct current conversion circuit 11, a direct current bus (a positive direct current bus bus+ and a negative direct current bus bus−), an inverter circuit 12, and a controller 13. Two input ends of the direct current conversion circuit 11 are connected to two input ends of the inverter 1, two output ends of the direct current conversion circuit 11 are connected to two input ends of the inverter circuit 12 respectively through the positive direct current bus bus+ and the negative direct current bus bus−, and a three-phase output end of the inverter circuit 12 is connected to a three-phase output end of the inverter 1. Optionally, the inverter 1 further includes a bus capacitor $C_{Bus}$, and the bus capacitor $C_{Bus}$ is connected between the positive direct current bus bus+ and the negative direct current bus bus−. The direct current conversion circuit 11 may be any one of a buck circuit, a boost circuit, and a buck-boost circuit.

In an optional implementation, after the inverter 1 operates, the controller 13 starts to obtain actual output active power and reference output active power of the inverter circuit 12, and obtains a reactive voltage control amount based on the actual output active power and the reference output active power of the inverter circuit 12, to adjust an output voltage of the inverter circuit 12 based on the reactive voltage control amount and a reference output voltage, so that an absolute value of a difference between the actual output active power and the reference output active power of the inverter circuit 12 is less than a difference threshold.

In this embodiment, the inverter 1 quickly adjusts an included angle between an output voltage vector $U_e$ of the inverter circuit 12 and a voltage vector $U_g$ of the alternating current power grid in an output voltage control manner of superimposing the reactive voltage control amount on the reference output voltage, so that the inverter 1 can quickly control actual output active power of the inverter 1 when the inverter 1 operates in a network construction control manner, and the inverter 1 can operate in a voltage source mode. Because the inverter 1 operates in the voltage source mode, the inverter 1 can further provide voltage and frequency support for the alternating current power grid without a delay.

Figure 3:
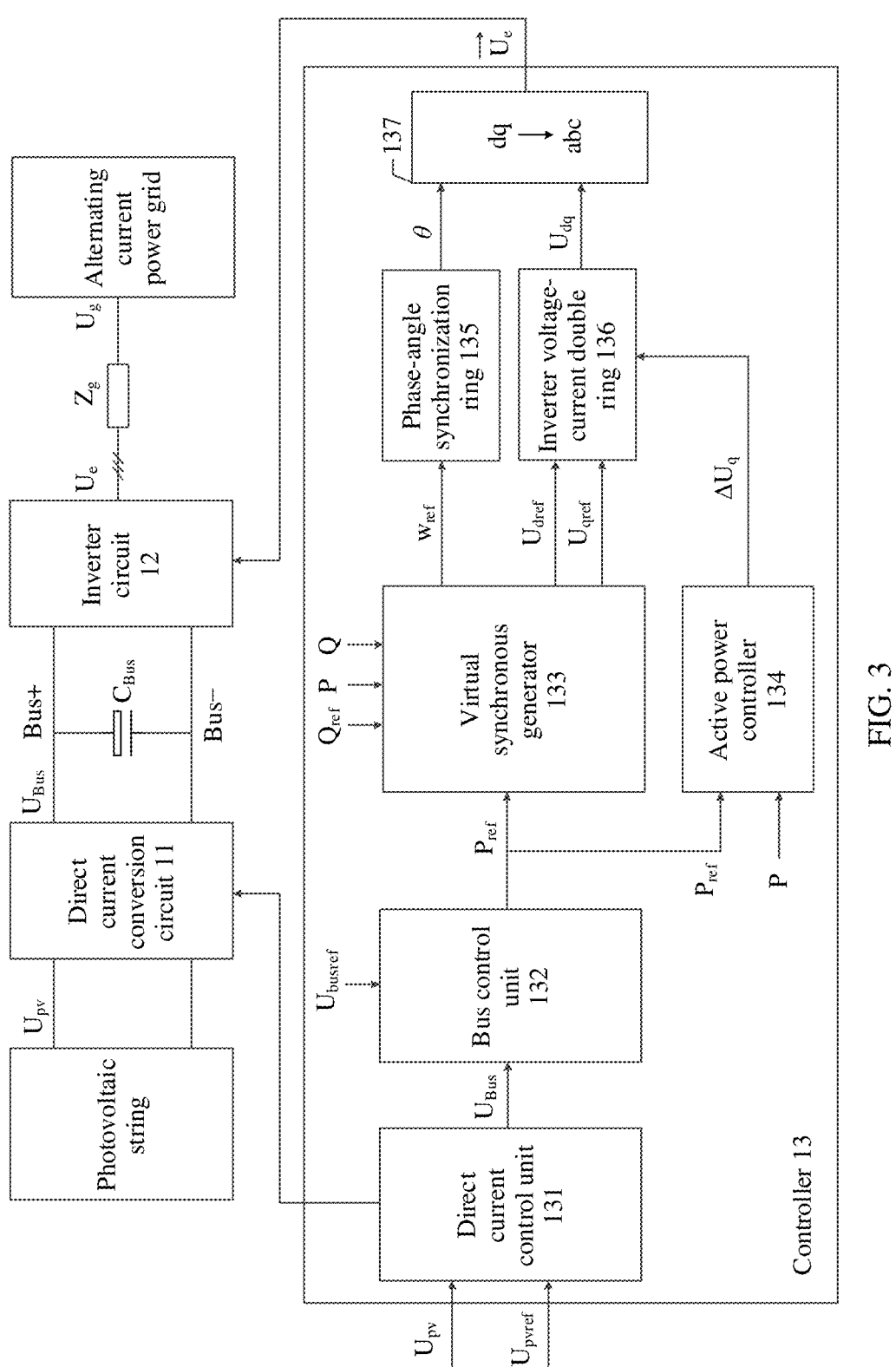
FIG. 3 is another schematic diagram of a structure of an inverter.

FIG. 3 is another schematic diagram of a structure of an inverter. As shown in FIG. 3, an inverter 1 includes a direct current conversion circuit 11, a direct current bus (a positive direct current bus bus+ and a negative direct current bus bus-), an inverter circuit 12, and a controller 13. Optionally, the inverter 1 further includes a bus capacitor $C_{Bus}$. The controller 13 includes a direct current control unit 131, a bus control unit 132, a virtual synchronous generator 133, an active power controller 134, a phase-angle synchronization ring 135, an inverter voltage-current double ring 136, and a coordinate conversion unit 137. Herein, for connection relationships of other circuit parts in the inverter 1 other than the controller 13, refer to descriptions of corresponding parts in the embodiment shown in FIG. 2. Details are not described herein again.

In an optional implementation, after the inverter 1 starts to operate, the controller 13 obtains a reactive voltage control amount based on actual output active power P and reference output active power $P_{ref}$ of the inverter circuit 12, and adjusts an output voltage $U_e$ of the inverter circuit 12 based on the reactive voltage control amount and a reference output voltage, to adjust the actual output active power P of the inverter circuit 12.

The reactive voltage control amount is a q-axis output voltage variation, that is, a voltage variation of a vertical projection of the output voltage $U_e$ of the inverter circuit 12 on a q-axis in dq coordinate axes.

In an optional embodiment, after the inverter 1 starts to operate, the controller 13 controls an input voltage of the direct current conversion circuit 11 to track a maximum power point of a photovoltaic string, and when the direct current conversion circuit 11 is in a maximum power point tracking (MPPT) working state, the controller 13 obtains an actual bus voltage $U_{bus}$ of the direct current bus. Then, the controller 13 obtains the reference output active power $P_{ref}$ of the inverter circuit 12 based on the actual bus voltage $U_{bus}$ and a reference bus voltage $U_{busref}$, and obtains the q-axis output voltage variation $\Delta U_q$ based on the reference output active power $P_{ref}$ and the actual output active power P of the inverter circuit 12, to adjust the output voltage $U_e$ of the inverter circuit 12 based on the q-axis output voltage variation $\Delta U_q$ and the reference output voltage $U_{ref}$.

After the inverter 1 starts to operate, the direct current control unit 131 controls the direct current conversion circuit 11 based on a reference voltage $U_{pvref}$ of the photovoltaic string, to control an output voltage $U_{pv}$ of the photovoltaic string, collects the output voltage $U_{pv}$ of the photovoltaic string, and tracks maximum power of the photovoltaic string, so that the direct current conversion circuit 11 is in the MPPT working state. Then, when the direct current conversion circuit 11 is in the MPPT working state, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ and the reference bus voltage $U_{busref}$ of the direct current bus, to output the reference output active power $P_{ref}$ of the inverter circuit 12 to the virtual synchronous generator 133 and the active power controller 134.

The active power controller 134 obtains the actual output active power P of the inverter circuit 12, obtains the q-axis output voltage variation $\Delta U_q$ based on the actual output active power P and the reference output active power $P_{ref}$ of the inverter circuit 12, and outputs the q-axis output voltage variation $\Delta U_q$ to the inverter voltage-current double ring 136. The active power controller 134 may be a PI controller, a PD controller, or a PID controller.

The virtual synchronous generator 133 is configured to output the reference output voltage $U_{ref}$ of the inverter circuit 12 based on the reference output active power $P_{ref}$, reference output reactive power $Q_{ref}$, the actual output active power P, and actual output reactive power Q of the inverter circuit 12. The reference output voltage $U_{ref}$ includes an output voltage reference frequency $w_{ref}$, a q-axis reference output voltage component $U_{qref}$, and a d-axis reference output voltage component $U_{dref}$. The virtual synchronous generator 133 is configured to: provide the output voltage reference frequency $w_{ref}$ to the phase-angle synchronization ring 135 and provide the q-axis reference output voltage component $U_{qref}$ and the d-axis reference output voltage component $U_{dref}$ to the inverter voltage-current double ring 136.

The inverter voltage-current double ring 136 obtains a q-axis target output voltage component $U_q=U_{qref}+\Delta U_q$ based on the q-axis reference output voltage component $U_{qref}$ provided by the virtual synchronous generator 133 and the q-axis output voltage variation $\Delta U_q$ provided by the active power controller 134, and outputs the q-axis target output voltage component $U_q$ and the d-axis reference output voltage component $U_{dref}$ to the coordinate conversion unit 137.

The phase-angle synchronization ring 135 obtains, through calculation, a voltage phase angle $\theta$ based on the output voltage reference frequency $w_{ref}$ provided by the virtual synchronous generator 133, and outputs the voltage phase angle $\theta$ to the coordinate conversion unit 137.

The coordinate conversion unit 137 converts the output voltage from two-phase rotational coordinates to a three-phase static coordinate system based on the voltage phase angle $\theta$, the q-axis target output voltage component $U_q$, and the d-axis reference output voltage component $U_{dref}$. Details are as follows:

$$U_a=U_d\times\cos\theta-U_q\times\sin\theta$$

$$U_b=U_d\times\cos(\theta-2\pi/3)-U_q\times\sin(\theta-2\pi/3)$$

$$U_c=U_d\times\cos(\theta-2\pi/3)-U_q\times\sin(\theta-2\pi/3).$$

$U_a=U_b$, and $U_c$ are voltage components of the output voltage $U_e$ in the three-phase static coordinate system, that is, voltage control signals of three-phase bridge arms in the inverter circuit 12. $U_d=U_{dref}$.

The coordinate conversion unit 137 outputs the voltage control signals $U_a$, $U_b$, and $U_c$ of the three-phase bridge arms in the inverter circuit 12 to the three-phase bridge arms of the inverter circuit 12 respectively, so that the inverter circuit 12 outputs the voltage $U_e$. In this way, the actual output active power of the inverter circuit 12 is adjusted, and an absolute value of a difference between the actual output active power of the inverter circuit 12 and the reference output active power is less than a difference threshold.

Figure 4:
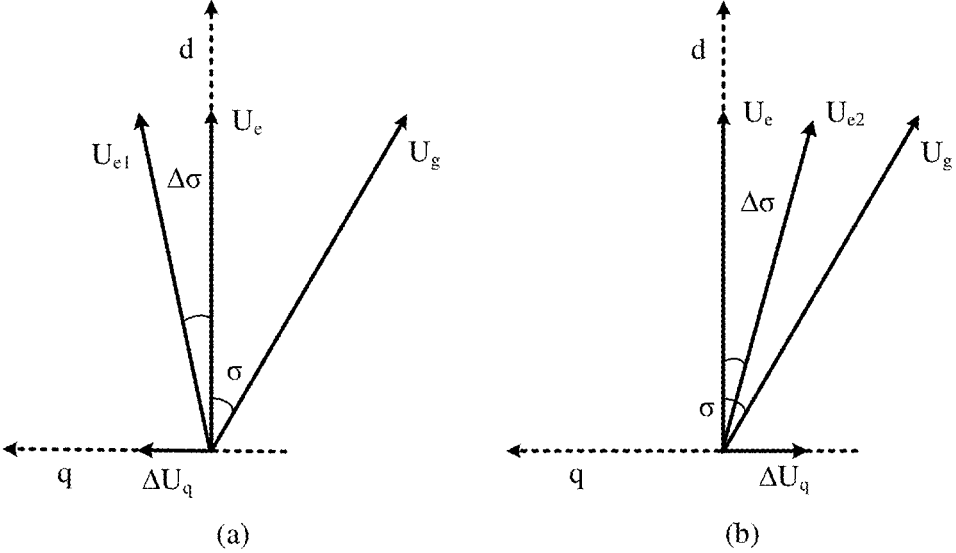
FIG. 4 is a control vector diagram of an output voltage of an inverter circuit.

For ease of understanding, with reference to FIG. 4, the following describes a working principle of quickly adjusting the actual output active power of the inverter circuit 12 through the q-axis output voltage variation $\Delta U_q$.

FIG. 4 is a control vector diagram of an output voltage of an inverter circuit. When the controller 13 obtains, based on the actual output active power P and the reference output active power $P_{ref}$ of the inverter circuit 12, that the actual output active power P is less than the reference output active power $P_{ref}$, the obtained q-axis output voltage variation $\Delta U_q$ is greater than 0. As shown in (a) in FIG. 4, the controller 13 quickly controls a position of an output voltage vector $U_e$ of the inverter circuit 12 to change to a position of a voltage vector $U_{e1}$, so that a q-axis output voltage component of the changed output voltage vector $U_{e1}$ is increased by $\Delta U_q$ compared to a q-axis output voltage component of the output voltage vector $U_e$ before the change. In this way, an included angle between the output voltage vector $U_e$ of the inverter circuit 12 and the voltage vector $U_g$ of the alternating current power grid is increased by $\Delta\sigma$, and further, the actual output active power of the inverter circuit 12 is increased, so that the actual output active power of the inverter circuit 12 can be quickly increased to the reference output active power.

Correspondingly, when the controller 13 obtains, based on the actual output active power P and the reference output active power $P_{ref}$ of the inverter circuit 12, that the actual output active power P is greater than the reference output active power $P_{ref}$, the obtained q-axis output voltage variation $\Delta U_q$ is less than 0. As shown in (b) in FIG. 4, the controller 13 quickly controls the position of the output voltage vector $U_e$ of the inverter circuit 12 to change to a position of a voltage vector $U_{e2}$, so that a q-axis output voltage component of the changed output voltage vector $U_{e2}$ is decreased by $\Delta U_q$ compared to a q-axis output voltage component of the output voltage vector $U_e$ before the change. In this way, the included angle between the output voltage vector $U_e$ of the inverter circuit 12 and the voltage vector $U_g$ of the alternating current power grid is decreased by $\Delta\sigma$, and further, the actual output active power of the inverter circuit 12 is decreased, so that the actual output active power of the inverter circuit 12 can be quickly decreased to the reference output active power.

Figure 5:
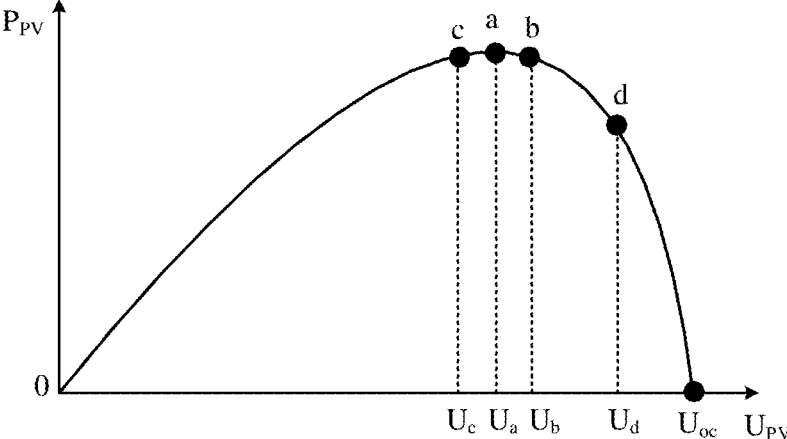
FIG. 5 is a schematic diagram of a curve between output power and an output voltage of a photovoltaic string.
Figure 6:
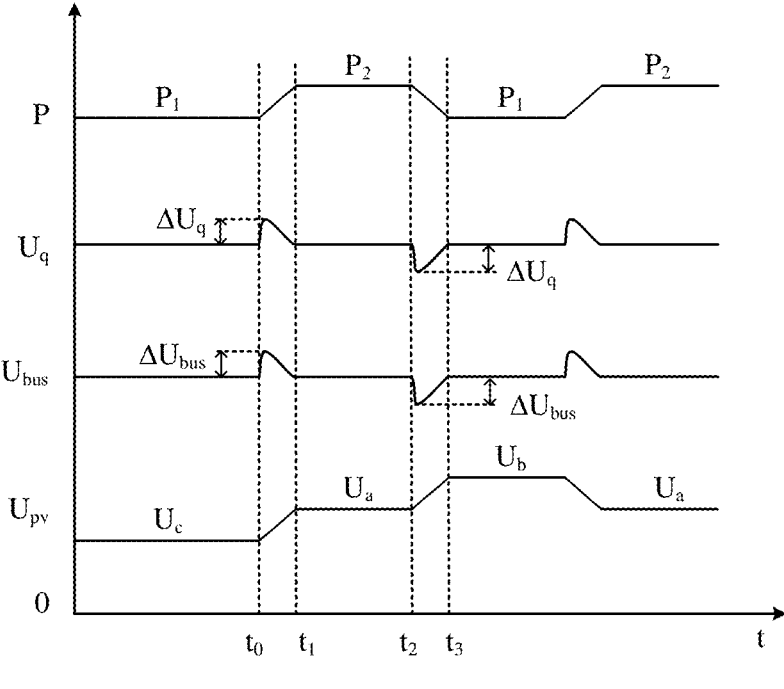
FIG. 6 is a control sequence diagram of an inverter.

Further, for ease of understanding, with reference to FIG. 5 and FIG. 6, the following describes a working principle in which the inverter 1 can still quickly adjust the actual output active power of the inverter circuit 12 based on the q-axis output voltage variation $\Delta U_q$ while the inverter 1 is in the MPPT working state.

As shown in FIG. 6, from a moment $t_0$ to a moment $t_1$, the direct current control unit 131 controls the direct current conversion circuit 11 to control the output voltage $U_{pv}$ of the photovoltaic string to increase from a voltage $U_c$ to a voltage $U_a$ shown in FIG. 5, so that output power $P_{pv}$ of the photovoltaic string is increased from output power Pc corresponding to a point c to output power $P_a$ corresponding to a point a shown in FIG. 5, and further, the actual bus voltage of the direct current bus is increased by $\Delta U_{bus}$, where $\Delta U_{bus}$ is greater than 0. Then, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ of the direct current bus. The active power controller 134 obtains, through calculation, the q-axis output voltage variation $\Delta U_q$ based on the reference output active power $P_{ref}$ of the inverter circuit 12, where $\Delta U_q$ is greater than 0. Then, the controller 13 controls the output voltage $U_e$ of the inverter circuit 12, so that the q-axis output voltage component is increased by $\Delta U_q$. The controller 13 quickly increases the q-axis output voltage component by $\Delta U_q$ in a manner of changing the output voltage vector $U_e$ shown in (a) in FIG. 4 to the voltage vector $U_{e1}$ shown in (a) in FIG. 4. Because the output voltage vector is always located on a d-axis, after the position of the output voltage vector $U_e$ changes to the position of the voltage vector $U_{e1}$, the d-axis rotates along with the output voltage vector to the position of the changed output voltage vector $U_{e1}$. Correspondingly, when the d-axis rotates along with the output voltage vector, the q-axis output voltage component is decreased by $\Delta U_q$, the actual bus voltage of the direct current bus is decreased by $\Delta U_{bus}$, and the actual output active power P of the inverter circuit 12 is increased from output active power PI to output active power $P_2$.

From a moment $t_2$ to a moment $t_3$, the direct current control unit 131 controls the direct current conversion circuit 11 to control the output voltage $U_{pv}$ of the photovoltaic string to increase from the voltage $U_a$ to a voltage $U_b$ shown in FIG. 5, so that the output power $P_{pv}$ of the photovoltaic string is decreased from the output power $P_a$ corresponding to the point a to output power Pb corresponding to a point b shown in FIG. 5, and further, the actual bus voltage $U_{bus}$ of the direct current bus is decreased by an absolute value of $\Delta U_{bus}$, where $\Delta U_{bus}$ is less than 0. Then, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ of the direct current bus. The active power controller 134 obtains, through calculation, the q-axis output voltage variation $\Delta U_q$ based on the reference output active power $P_{ref}$ of the inverter circuit 12, where $\Delta U_q$ is less than 0. Then, the controller 13 controls the output voltage $U_e$ of the inverter circuit 12, so that the q-axis output voltage component is decreased by an absolute value of $\Delta U_q$. The controller 13 quickly decreases the q-axis output voltage component by the absolute value of $\Delta U_q$ in a manner of changing the output voltage vector $U_e$ shown in (b) in FIG. 4 to the voltage vector $U_{e2}$ shown in (b) in FIG. 4. Because the output voltage vector is always located on the d-axis, after the position of the output voltage vector $U_e$ changes to the position of the voltage vector $U_{e2}$, the d-axis rotates along with the output voltage vector to the position of the changed output voltage vector $U_{e2}$. Correspondingly, when the d-axis rotates along with the output voltage vector, the q-axis output voltage component is increased by the absolute value of $\Delta U_q$, the actual bus voltage of the direct current bus is increased by the absolute value of $\Delta U_{bus}$, and the actual output active power P of the inverter circuit 12 is decreased from the output active power $P_2$ to the output active power $P_1$.

In this embodiment, the controller 13 may control the output voltage of the inverter circuit 12 in a manner of superimposing the q-axis output voltage variation $\Delta U_q$ on the q-axis reference output voltage component $U_{qref}$, to adjust the included angle between the output voltage vector of the inverter circuit 12 and the voltage vector of the alternating current power grid based on the q-axis output voltage variation $\Delta U_q$. In this way, actual output active power of the inverter 1 when the inverter 1 operates in a network construction control manner can be quickly adjusted, and the inverter 1 can operate in a voltage source mode. Because the inverter 1 operates in the voltage source mode, the inverter 1 can further provide voltage and frequency support for the alternating current power grid without a delay. In addition, when the inverter 1 operates in the voltage source mode, the inverter 1 may also consider an MPPT scenario, so that an energy yield of the inverter 1 can be effectively improved.

Figure 7:
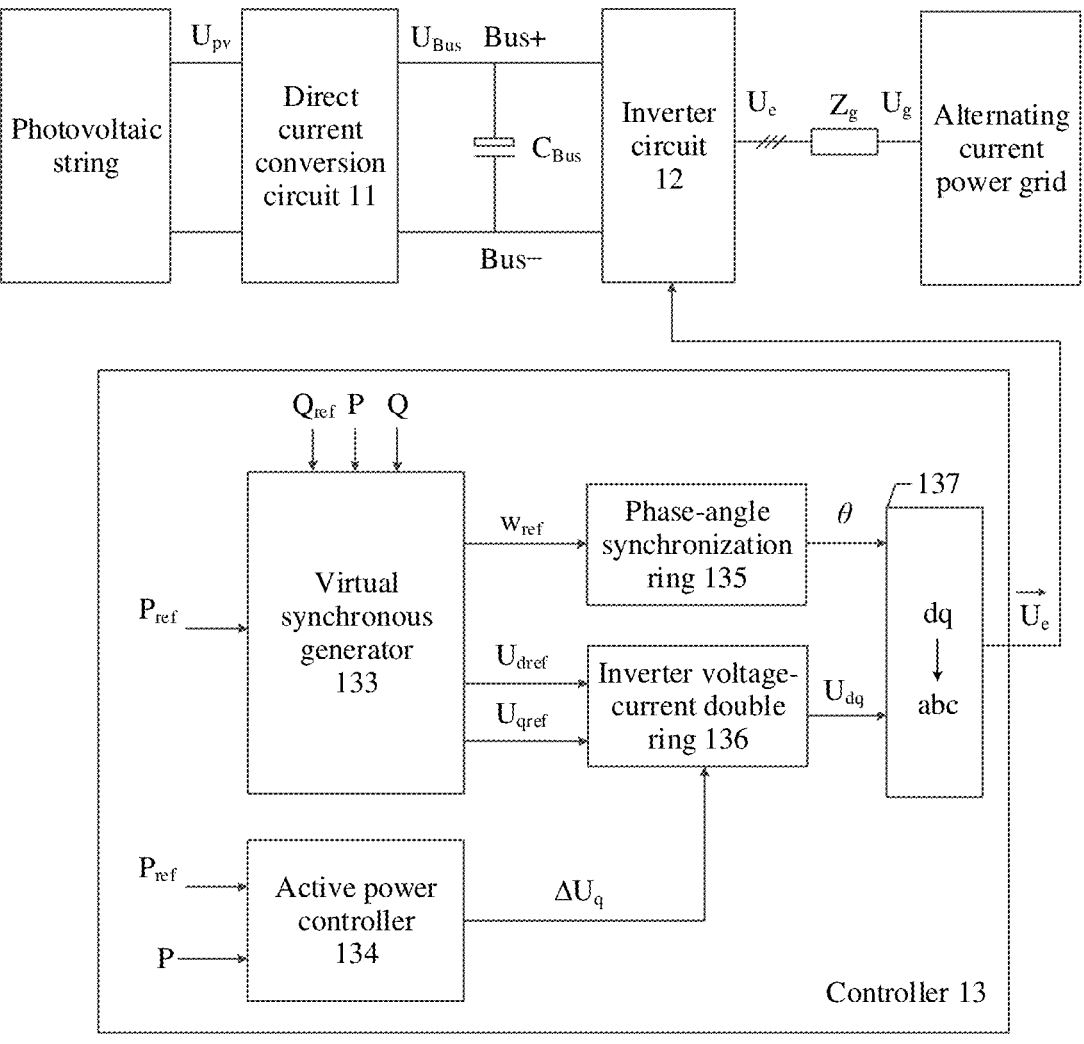
FIG. 7 is another schematic diagram of a structure of an inverter.

In another optional embodiment, as shown in FIG. 7, after the inverter 1 starts to operate, when the inverter 1 receives a power scheduling instruction, the controller 13 determines first power carried in the power scheduling instruction as the reference output active power $P_{ref}$ of the inverter circuit 12, and obtains the q-axis output voltage variation $\Delta U_q$ based on the reference output active power $P_{ref}$ and the actual output active power P of the inverter circuit 12, to adjust the output voltage $U_e$ of the inverter circuit 12 based on the q-axis output voltage variation $\Delta U_q$ and the reference output voltage $U_{ref}$. The power scheduling instruction may be a power decrease instruction or may be a power increase instruction.

After determining the first power as the reference output active power $P_{ref}$ of the inverter circuit 12, the controller 13 outputs the reference output active power $P_{ref}$ of the inverter circuit 12 to the virtual synchronous generator 133 and the active power controller 134.

The active power controller 134 obtains the actual output active power P of the inverter circuit 12, obtains the q-axis output voltage variation $\Delta U_q$ based on the actual output active power P and the reference output active power $P_{ref}$ of the inverter circuit 12, and outputs the q-axis output voltage variation $\Delta U_q$ to the inverter voltage-current double ring 136. The active power controller 134 may be a PI controller, a PD controller, or a PID controller.

The virtual synchronous generator 133 is configured to output the reference output voltage $U_{ref}$ of the inverter circuit 12 based on the reference output active power $P_{ref}$, reference output reactive power $Q_{ref}$, the actual output active power P, and actual output reactive power Q of the inverter circuit 12. The reference output voltage $U_{ref}$ includes an output voltage reference frequency $w_{ref}$, a q-axis reference output voltage component $U_{qref}$, and a d-axis reference output voltage component $U_{dref}$. The virtual synchronous generator 133 is configured to: provide the output voltage reference frequency $w_{ref}$ to the phase-angle synchronization ring 135 and provide the q-axis reference output voltage component $U_{qref}$ and the d-axis reference output voltage component $U_{dref}$ to the inverter voltage-current double ring 136.

The inverter voltage-current double ring 136 obtains a q-axis target output voltage component $U_q=U_{qref}+\Delta U_q$ based on the q-axis reference output voltage component $U_{qref}$ provided by the virtual synchronous generator 133 and the q-axis output voltage variation $\Delta U_q$ provided by the active power controller 134, and outputs the q-axis target output voltage component $U_q$ and the d-axis reference output voltage component $U_{dref}$ to the coordinate conversion unit 137.

The phase-angle synchronization ring 135 obtains, through calculation, a voltage phase angle $\theta$ based on the output voltage reference frequency $w_{ref}$ provided by the virtual synchronous generator 133, and outputs the voltage phase angle $\theta$ to the coordinate conversion unit 137.

The coordinate conversion unit 137 converts the output voltage from two-phase rotational coordinates to a three-phase static coordinate system based on the voltage phase angle $\theta$, the q-axis target output voltage component $U_q$, and the d-axis reference output voltage component $U_{dref}$. Details are as follows:

$$U_a = U_d \times \cos\theta - U_q \times \sin\theta$$

$$U_b = U_d \times \cos(\theta - 2\pi/3) - U_q \times \sin(\theta - 2\pi/3)$$

$$U_c = U_d \times \cos(\theta + 2\pi/3) - U_q \times \sin(\theta + 2\pi/3).$$

$U_a$, $U_b$, and $U_c$ are voltage components of the output voltage $U_e$ in the three-phase static coordinate system, that is, voltage control signals of three-phase bridge arms in the inverter circuit 12. $U_d = U_{dref}$.

The coordinate conversion unit 137 outputs the voltage control signals $U_a$, $U_b$, and $U_c$ of the three-phase bridge arms in the inverter circuit 12 to the three-phase bridge arms of the inverter circuit 12 respectively, so that the inverter circuit 12 outputs the voltage $U_e$. In this way, the actual output active power of the inverter circuit 12 is adjusted, and an absolute value of a difference between the actual output active power of the inverter circuit 12 and the reference output active power is less than a difference threshold.

Herein, for a working principle in which the controller 13 quickly adjusts the actual output active power of the inverter circuit 12 through the q-axis output voltage variation $\Delta U_q$, refer to the description of the corresponding part in the foregoing embodiments. Details are not described herein again.

In this embodiment, the controller 13 may control the output voltage of the inverter circuit 12 in a manner of superimposing the q-axis output voltage variation $\Delta U_q$ on the q-axis reference output voltage component $U_{qref}$, to adjust the included angle between the output voltage vector of the inverter circuit 12 and the voltage vector of the alternating current power grid based on the q-axis output voltage variation $\Delta U_q$. In this way, actual output active power of the inverter 1 when the inverter 1 operates in a network construction control manner can be quickly adjusted, and the inverter 1 can operate in a voltage source mode. Because the inverter 1 operates in the voltage source mode, the inverter 1 can further provide voltage and frequency support for the alternating current power grid without a delay. In addition, when operating in the voltage source mode, the inverter 1 may further implement a fast power scheduling response, so that the output power of the photovoltaic module is stable at a non-maximum power point, and output power of the inverter 1 is stable.

The controller 13 may control the output voltage of the inverter circuit 12 based on a manner of superimposing the q-axis output voltage variation $\Delta U_q$ on the q-axis reference output voltage component $U_{qref}$, so that actual output active power of the inverter 1 when the inverter 1 operates in a network construction control manner can be quickly adjusted, and the inverter 1 can operate in a voltage source mode. Because the inverter 1 operates in the voltage source mode, the inverter 1 can further provide voltage and frequency support for the alternating current power grid without a delay. In addition, when the inverter 1 operates in the voltage source mode, the inverter 1 may further consider an MPPT scenario or a fast response scenario of a power scheduling instruction. Therefore, the inverter 1 has strong applicability.

Figure 8:
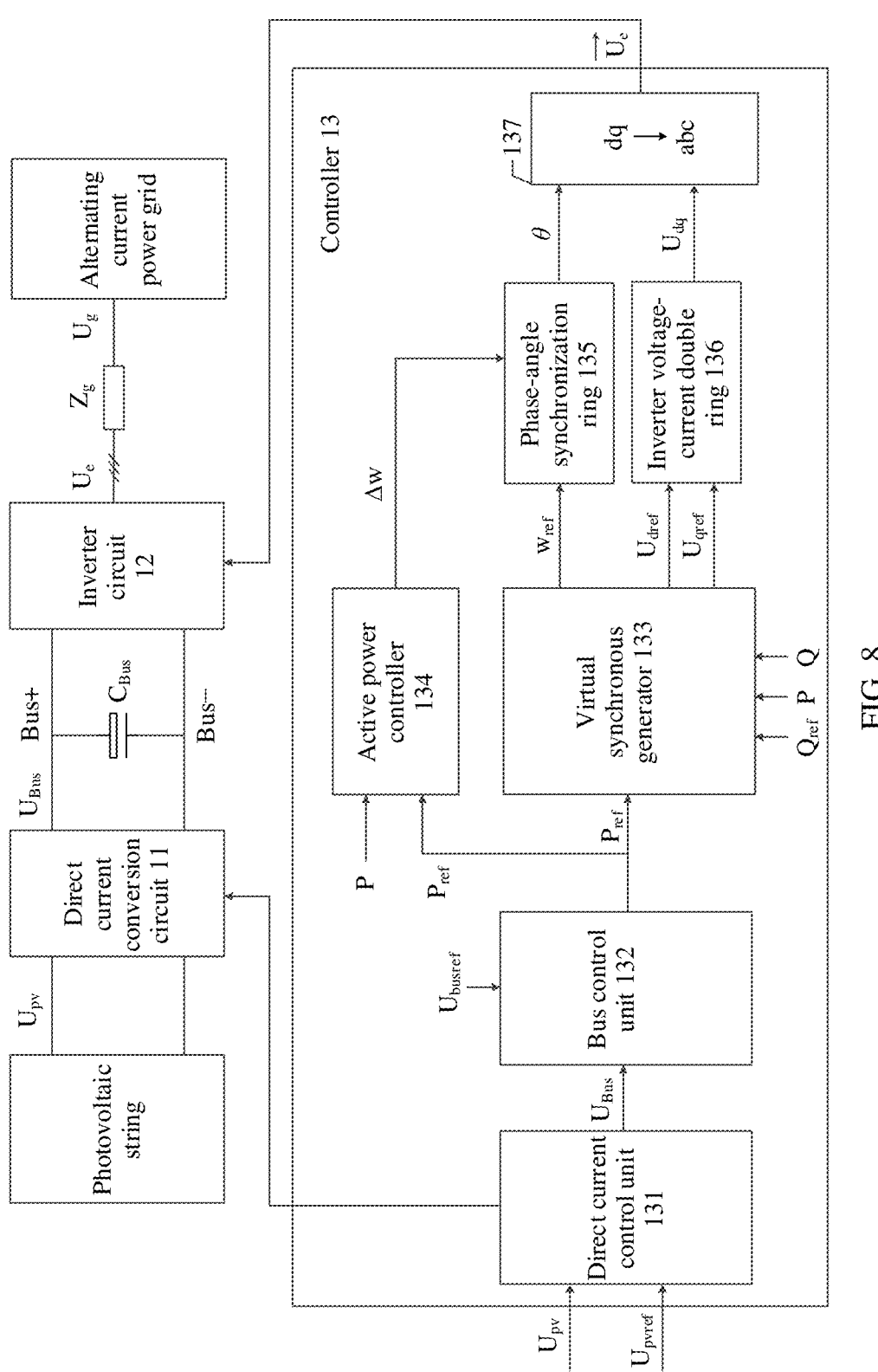
FIG. 8 is another schematic diagram of a structure of an inverter.

FIG. 8 is another schematic diagram of a structure of an inverter. As shown in FIG. 8, an inverter 1 includes a direct current conversion circuit 11, a direct current bus (a positive direct current bus bus+ and a negative direct current bus bus-), an inverter circuit 12, and a controller 13. Optionally, the inverter 1 further includes a bus capacitor $C_{Bus}$. The controller 13 includes a direct current control unit 131, a bus control unit 132, a virtual synchronous generator 133, an active power controller 134, a phase-angle synchronization ring 135, an inverter voltage-current double ring 136, and a coordinate conversion unit 137. Herein, for connection relationships of other circuit parts in the inverter 1 other than the controller 13, refer to descriptions of corresponding parts in the embodiment shown in FIG. 2. Details are not described herein again.

In an optional implementation, after the inverter 1 starts to operate, the controller 13 obtains a reactive voltage control amount based on actual output active power P and reference output active power $P_{ref}$ of the inverter circuit 12, and adjusts an output voltage $U_e$ of the inverter circuit 12 based on the reactive voltage control amount and a reference output voltage, to adjust the actual output active power P of the inverter circuit 12.

In an optional embodiment, the reactive voltage control amount is an output voltage frequency variation.

After the inverter 1 starts to operate, the controller 13 controls an input voltage of the direct current conversion circuit 11 to track a maximum power point of a photovoltaic string and obtains an actual bus voltage $U_{bus}$ of the direct current bus when the direct current conversion circuit 11 is in an MPPT working state. Then, the controller 13 obtains the reference output active power $P_{ref}$ of the inverter circuit 12 based on the actual bus voltage $U_{bus}$ and a reference bus voltage $U_{busref}$, and obtains an output voltage frequency variation $\Delta w$ based on the reference output active power $P_{ref}$ and the actual output active power P of the inverter circuit 12, to adjust the output voltage $U_e$ of the inverter circuit 12 based on the output voltage frequency variation $\Delta w$ and the reference output voltage $U_{ref}$.

After the inverter 1 starts to operate, the direct current control unit 131 controls the direct current conversion circuit 11 based on a reference voltage $U_{pvref}$ of the photovoltaic string, to control an output voltage $U_{pv}$ of the photovoltaic string, collects the output voltage $U_{pv}$ of the photovoltaic string, and tracks maximum power of the photovoltaic string, so that the direct current conversion circuit 11 is in the MPPT working state. Then, when the direct current conversion circuit 11 is in the MPPT working state, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ and the reference bus voltage $U_{busref}$ of the direct current bus, to output the reference output active power $P_{ref}$ of the inverter circuit 12 to the virtual synchronous generator 133 and the active power controller 134.

The active power controller 134 obtains the actual output active power P of the inverter circuit 12, obtains the output voltage frequency variation $\Delta w$ based on the actual output active power P and the reference output active power $P_{ref}$ of the inverter circuit 12, and outputs the output voltage frequency variation $\Delta w$ to the phase-angle synchronization ring 135. The active power controller 134 may be a PI controller, a PD controller, or a PID controller.

The virtual synchronous generator 133 is configured to output the reference output voltage $U_{ref}$ of the inverter circuit 12 based on the reference output active power $P_{ref}$, reference output reactive power $Q_{ref}$, the actual output active power P, and actual output reactive power Q of the inverter circuit 12. The reference output voltage $U_{ref}$ includes an output voltage reference frequency $w_{ref}$, a q-axis reference output voltage component $U_{qref}$, and a d-axis reference output voltage component $U_{dref}$. The virtual synchronous generator 133 is configured to: provide the output voltage reference frequency $w_{ref}$ to the phase-angle synchronization ring 135 and provide the q-axis reference output voltage component $U_{qref}$ and the d-axis reference output voltage component $U_{dref}$ to the inverter voltage-current double ring 136.

The phase-angle synchronization ring 135 obtains, through calculation, an output voltage target frequency $\omega = w_{ref} + \Delta w$ based on the output voltage reference frequency $w_{ref}$ provided by the virtual synchronous generator 133 and the output voltage frequency variation $\Delta w$ provided by the active power controller 134, obtains, through calculation, a voltage phase angle $\theta$ based on the output voltage target frequency $\omega$, and outputs the voltage phase angle $\theta$ to the coordinate conversion unit 137.

The inverter voltage-current double ring 136 outputs, to the coordinate conversion unit 137, the q-axis reference output voltage component $U_{qref}$ and the d-axis reference output voltage component $U_{dref}$ that are provided by the virtual synchronous generator 133.

The coordinate conversion unit 137 converts the output voltage from two-phase rotational coordinates to a three-phase static coordinate system based on the voltage phase angle $\theta$, the q-axis reference output voltage component $U_{qref}$, and the d-axis reference output voltage component $U_{dref}$. Details are as follows:

$$U_a = U_d \times \cos\theta - U_q \times \sin\theta$$

$$U_b = U_d \times \cos(\theta - 2\pi/3) - U_q \times \sin(\theta - 2\pi/3)$$

$$U_c = U_d \times \cos(\theta + 2\pi/3) - U_q \times \sin(\theta + 2\pi/3).$$

$U_a$, $U_b$, and $U_c$ are voltage components of the output voltage $U_e$ in the three-phase static coordinate system, that is, voltage control signals of three-phase bridge arms in the inverter circuit 12. $U_d = U_{dref}$, and $U_q = U_{qref}$.

The coordinate conversion unit 137 outputs the voltage control signals $U_a$, $U_b$, and $U_c$ of the three-phase bridge arms in the inverter circuit 12 to the three-phase bridge arms of the inverter circuit 12 respectively, so that the inverter circuit 12 outputs the voltage $U_e$. In this way, the actual output active power of the inverter circuit 12 is adjusted, and an absolute value of a difference between the actual output active power of the inverter circuit 12 and the reference output active power is less than a difference threshold.

Figure 9:
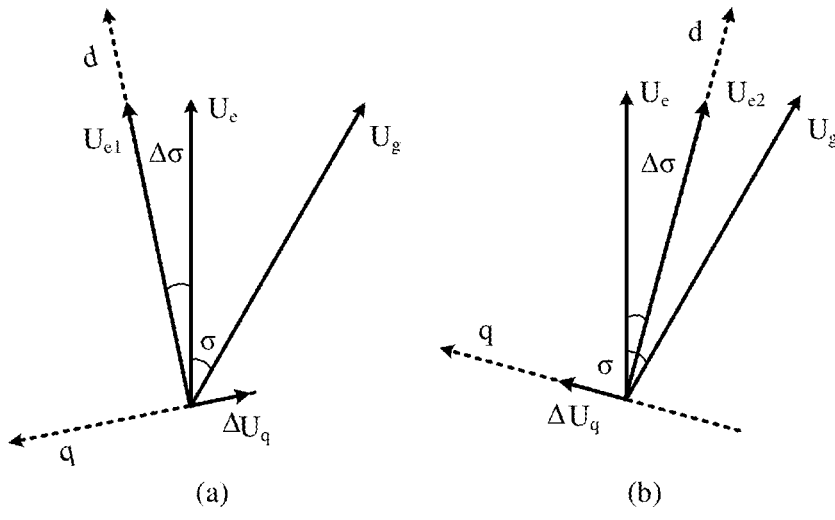
FIG. 9 is another control vector diagram of an output voltage of an inverter circuit.

For ease of understanding, with reference to FIG. 9, the following describes a working principle of quickly adjusting the actual output active power of the inverter circuit 12 through the output voltage frequency variation $\Delta w$.

FIG. 9 is another control vector diagram of an output voltage of an inverter circuit. When the controller 13 obtains, based on the actual output active power P and the reference output active power $P_{ref}$ of the inverter circuit 12, that the actual output active power P is less than the reference output active power $P_{ref}$, an included angle variation $\Delta\sigma$ between the output voltage vector $U_e$ corresponding to the output voltage frequency variation $\Delta w$ and the voltage vector $U_g$ of the alternating current power grid is greater than 0, so that the q-axis output voltage variation $\Delta U_q$ corresponding to the included angle variation $\Delta\sigma$ is less than 0. As shown in (a) in FIG. 9, the controller 13 quickly controls dq coordinate axes to rotate counterclockwise, so that a position of a d axis coincides with a position of a voltage vector $U_{e1}$. Because the output voltage vector is always located on the d axis, after the d axis rotates to the position of the voltage vector $U_{e1}$, a position of the output voltage vector $U_e$ rotates to the position of the voltage vector $U_{e1}$ along with the d axis, so that an included angle between the changed output voltage vector $U_{e1}$ and the voltage vector $U_g$ of the alternating current power grid is increased by $\Delta\sigma$ compared with an included angle between the output voltage vector $U_e$ before the change and the voltage vector $U_g$ of the alternating current power grid. In this way, the q-axis output voltage component of the output voltage vector is decreased by an absolute value of $\Delta U_q$, and further, the actual output active power of the inverter circuit 12 is increased, so that the actual output active power of the inverter circuit 12 can be quickly increased to the reference output active power.

Correspondingly, when the controller 13 obtains, based on the actual output active power P and the reference output active power $P_{ref}$ of the inverter circuit 12, that the actual output active power P is greater than the reference output active power $P_{ref}$, the included angle variation $\Delta\sigma$ between the output voltage vector $U_e$ corresponding to the output voltage frequency variation $\Delta w$ and the voltage vector $U_g$ of the alternating current power grid is less than 0, so that the q-axis output voltage variation $\Delta U_q$ corresponding to the included angle variation $\Delta\sigma$ is greater than 0. As shown in (b) in FIG. 9, the controller 13 quickly controls dq axes to rotate clockwise, so that a position of the d axis coincides with a position of a voltage vector $U_{e2}$. Because the output voltage vector is always located on the d axis, after the d axis rotates to the position of the voltage vector $U_{e2}$, a position of the output voltage vector $U_e$ rotates to the position of the voltage vector $U_{e2}$ along with the d axis, so that an included angle between the changed output voltage vector $U_{e2}$ and the voltage vector $U_g$ of the alternating current power grid is decreased by an absolute value of $\Delta\sigma$ compared with an included angle between the output voltage vector $U_e$ before the change and the voltage vector $U_g$ of the alternating current power grid. In this way, the q-axis output voltage component of the output voltage vector is increased by $\Delta U_q$, and further, the actual output active power of the inverter circuit 12 is decreased, so that the actual output active power of the inverter circuit 12 can be quickly decreased to the reference output active power.

Figure 10:
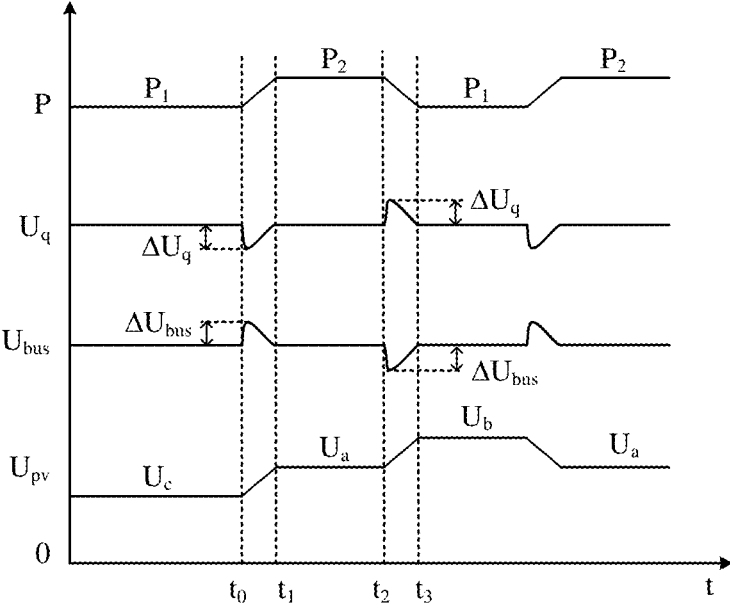
FIG. 10 is another control sequence diagram of an inverter.

Further, for ease of understanding, with reference to FIG. 5 and FIG. 10, the following describes a working principle in which the inverter 1 can still quickly adjust the actual output active power of the inverter circuit 12 based on the output voltage frequency variation $\Delta w$ while the inverter 1 is in the MPPT working state.

As shown in FIG. 10, from a moment $t_0$ to a moment $t_1$, the direct current control unit 131 controls the direct current conversion circuit 11 to control the output voltage $U_{pv}$ of the photovoltaic string to increase from the voltage $U_c$ to the voltage $U_a$ shown in FIG. 5, so that the output power $P_{pv}$ of the photovoltaic string is increased from the output power Pc corresponding to the point c to the output power $P_a$ corresponding to the point a shown in FIG. 5, and further, the actual bus voltage of the direct current bus is increased by $\Delta U_{bus}$, where $\Delta U_{bus}$ is greater than 0. Then, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ of the direct current bus. The active power controller 134 obtains, through calculation, the output voltage frequency variation $\Delta w$ based on the reference output active power $P_{ref}$ of the inverter circuit 12, where an included angle variation $\Delta\sigma$ between the output voltage frequency variation $\Delta w$ and the voltage vector $U_g$ of the alternating current power grid is greater than 0, and the q-axis output voltage variation $\Delta U_q$ corresponding to the included angle variation $\Delta\sigma$ is less than 0. Then, the controller 13 controls the output voltage $U_e$ of the inverter circuit 12 to increase the included angle between the output voltage vector $U_e$ and the voltage vector $U_g$ of the alternating current power grid by $\Delta\sigma$, so that the q-axis output voltage component is decreased by an absolute value of $\Delta U_q$. The controller 13 rotates the dq coordinate axes shown in (a) in FIG. 9 counterclockwise until the d axis coincides with the position of the voltage vector $U_{e1}$, so that the included angle between the output voltage vector $U_e$ and the voltage vector $U_g$ of the alternating current power grid is rapidly increased by $\Delta\sigma$, and the q-axis output voltage component is rapidly decreased by the absolute value of $\Delta U_q$. Because the output voltage vector is always located on the d-axis, after the d-axis rotates to the position of the voltage vector $U_{e1}$, the position of the output voltage vector $U_e$ rotates to the position of the voltage vector $U_{e1}$ along with the d-axis. Correspondingly, when the output voltage vector $U_e$ rotates along with the d axis, the q-axis output voltage component is increased by the absolute value of $\Delta U_q$, the actual bus voltage of the direct current bus is decreased by $\Delta U_{bus}$, and the actual output active power P of the inverter circuit 12 is increased from the output active power $P_1$ to the output active power $P_2$.

From a moment $t_2$ to a moment $t_3$, the direct current control unit 131 controls the direct current conversion circuit 11 to control the output voltage $U_{pv}$ of the photovoltaic string to increase from the voltage $U_a$ to a voltage $U_b$ shown in FIG. 5, so that the output power $P_{pv}$ of the photovoltaic string is decreased from the output power $P_a$ corresponding to the point a to output power Pb corresponding to a point b shown in FIG. 5, and further, the actual bus voltage $U_{bus}$ of the direct current bus is decreased by an absolute value of $\Delta U_{bus}$, where $\Delta U_{bus}$ is less than 0. Then, the bus control unit 132 collects the actual bus voltage $U_{bus}$ of the direct current bus, and obtains, through calculation, the reference output active power $P_{ref}$ of the inverter circuit 12 based on the actual bus voltage $U_{bus}$ of the direct current bus. The active power controller 134 obtains, through calculation, the output voltage frequency variation $\Delta w$ based on the reference output active power $P_{ref}$ of the inverter circuit 12, where an included angle variation $\Delta\sigma$ between the output voltage vector $U_e$ corresponding to the output voltage frequency variation $\Delta w$ and the voltage vector $U_g$ of the alternating current power grid is less than 0, and the q-axis output voltage variation $\Delta U_q$ corresponding to the included angle variation $\Delta\sigma$ is greater than 0. Then, the controller 13 controls the output voltage $U_e$ of the inverter circuit 12 to decrease the included angle between the output voltage vector $U_e$ and the voltage vector $U_g$ of the alternating current power grid by an absolute value of $\Delta\sigma$, so that the q-axis output voltage component is increased by $\Delta U_q$. The controller 13 rotates the dq coordinate axes shown in (b) in FIG. 9 clockwise until the d axis coincides with the position of the voltage vector $U_{e2}$, so that the included angle between the output voltage vector $U_e$ and the voltage vector $U_g$ of the alternating current power grid is rapidly decreased by the absolute value of $\Delta\sigma$, and the q-axis output voltage component is rapidly increased by $\Delta U_q$. Because the output voltage vector is always located on the d-axis, after the d-axis rotates to the position of the voltage vector $U_{e2}$, the position of the output voltage vector $U_e$ rotates to the position of the voltage vector $U_{e2}$ along with the d-axis. Correspondingly, when the output voltage vector $U_e$ rotates along with the d-axis, the q-axis output voltage component is decreased by $\Delta U_q$, the actual bus voltage of the direct current bus is increased by an absolute value of $\Delta U_{bus}$, and the actual output active power P of the inverter circuit 12 is decreased from the output active power $P_2$ to the output active power $P_1$.

In this embodiment, the controller 13 may control the output voltage of the inverter circuit 12 in a manner of superimposing the output voltage frequency variation $\Delta w$ on the output voltage reference frequency $w_{ref}$ to adjust the included angle between the output voltage vector of the inverter circuit 12 and the voltage vector of the alternating current power grid based on the output voltage frequency variation $\Delta w$, and further adjust the q-axis output voltage variation $\Delta U_q$. In this way, actual output active power of the inverter 1 when the inverter 1 operates in a network construction control manner can be quickly adjusted, and the inverter 1 can operate in a voltage source mode. Because the inverter 1 operates in the voltage source mode, the inverter 1 can further provide voltage and frequency support for the alternating current power grid without a delay. In addition, when the inverter 1 operates in the voltage source mode, the inverter 1 may also consider an MPPT scenario, so that an energy yield of the photovoltaic string can be effectively improved.

Figure 11:
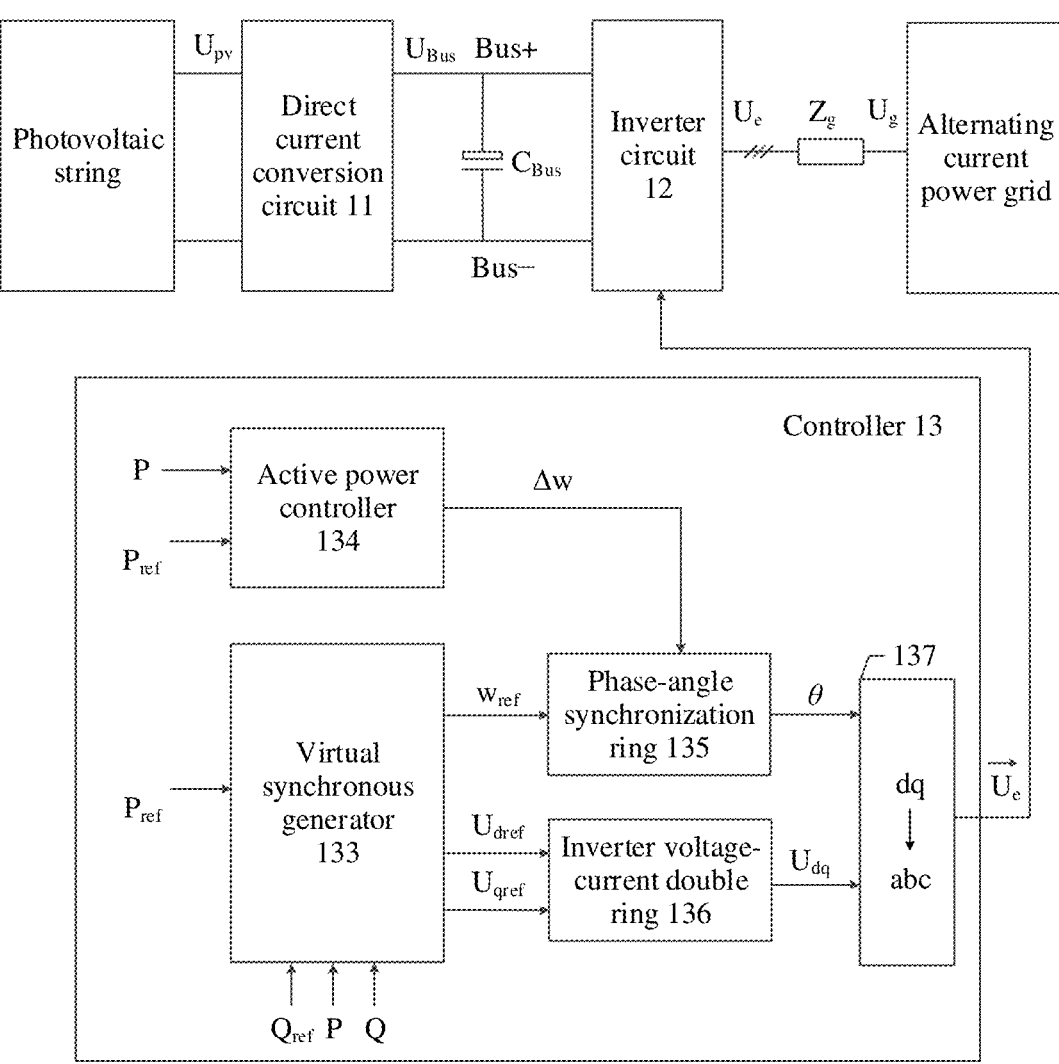
FIG. 11 is still another schematic diagram of a structure of an inverter.

In another optional embodiment, as shown in FIG. 11, after the inverter 1 starts to operate, when the inverter 1 receives a power scheduling instruction, the controller 13 determines first power carried in the power scheduling instruction as the reference output active power $P_{ref}$ of the inverter circuit 12, and obtains the output voltage frequency variation $\Delta w$ based on the reference output active power $P_{ref}$ and the actual output active power P of the inverter circuit 12, to adjust the output voltage $U_e$ of the inverter circuit 12 based on the output voltage frequency variation $\Delta w$ and the reference output voltage $U_{ref}$.

After determining the first power as the reference output active power $P_{ref}$ of the inverter circuit 12, the controller 13 outputs the reference output active power $P_{ref}$ of the inverter circuit 12 to the virtual synchronous generator 133 and the active power controller 134.

The active power controller 134 obtains the actual output active power P of the inverter circuit 12, obtains the output voltage frequency variation $\Delta w$ based on the actual output active power P and the reference output active power $P_{ref}$ of the inverter circuit 12, and outputs the output voltage frequency variation $\Delta w$ to the phase-angle synchronization ring 135. The active power controller 134 may be a PI controller, a PD controller, or a PID controller.

The virtual synchronous generator 133 is configured to output the reference output voltage $U_{ref}$ of the inverter circuit 12 based on the reference output active power $P_{ref}$, reference output reactive power $Q_{ref}$, the actual output active power P, and actual output reactive power Q of the inverter circuit 12. The reference output voltage $U_{ref}$ includes an output voltage reference frequency $w_{ref}$, a q-axis reference output voltage component $U_{qref}$, and a d-axis reference output voltage component $U_{dref}$. The virtual synchronous generator 133 is configured to: provide the output voltage reference frequency $w_{ref}$ to the phase-angle synchronization ring 135 and provide the q-axis reference output voltage component $U_{qref}$ and the d-axis reference output voltage component $U_{dref}$ to the inverter voltage-current double ring 136.

The phase-angle synchronization ring 135 obtains, through calculation, an output voltage target frequency $\omega = w_{ref} + \Delta w$ based on the output voltage reference frequency $w_{ref}$ provided by the virtual synchronous generator 133 and the output voltage frequency variation $\Delta w$ provided by the active power controller 134, obtains, through calculation, a voltage phase angle $\theta$ based on the output voltage target frequency $\omega$, and outputs the voltage phase angle $\theta$ to the coordinate conversion unit 137.

The inverter voltage-current double ring 136 outputs, to the coordinate conversion unit 137, the q-axis reference output voltage component $U_{qref}$ and the d-axis reference output voltage component $U_{dref}$ that are provided by the virtual synchronous generator 133.

The coordinate conversion unit 137 converts the output voltage from two-phase rotational coordinates to a three-phase static coordinate system based on the voltage phase angle $\theta$, the q-axis reference output voltage component $U_{qref}$, and the d-axis reference output voltage component $U_{dref}$. Details are as follows:

$$U_a = U_d \times \cos\theta - U_q \times \sin e$$

$$U_b = U_d \times \cos(\theta - 2\pi/3) - U_q \times \sin(\theta - 2\pi/3)$$

$$U_c = U_d \times \cos(\theta + 2\pi/3) - U_q \times \sin(\theta + 2\pi/3).$$

$U_a$, $U_b$, and $U_c$ are voltage components of the output voltage $U_e$ in the three-phase static coordinate system, that is, voltage control signals of three-phase bridge arms in the inverter circuit 12. $U_d = U_{dref}$, and $U_q = U_{qref}$.

The coordinate conversion unit 137 outputs the voltage control signals $U_a$, $U_b$, and $U_c$ of the three-phase bridge arms in the inverter circuit 12 to the three-phase bridge arms of the inverter circuit 12 respectively, so that the inverter circuit 12 outputs the voltage $U_e$. In this way, the actual output active power of the inverter circuit 12 is adjusted, and an absolute value of a difference between the actual output active power of the inverter circuit 12 and the reference output active power is less than a difference threshold.

Herein, for a working principle in which the controller 13 quickly adjusts the actual output active power of the inverter circuit 12 through the output voltage frequency variation $\Delta w$, refer to the description of the corresponding part in the foregoing embodiments. Details are not described herein again.

In this embodiment, the controller 13 may control the output voltage of the inverter circuit 12 in a manner of superimposing the output voltage frequency variation $\Delta w$ on the output voltage reference frequency $w_{ref}$, to adjust the included angle between the output voltage vector of the inverter circuit 12 and the voltage vector of the alternating current power grid based on the output voltage frequency variation $\Delta w$, and further adjust the q-axis output voltage variation $\Delta U_q$. In this way, actual output active power of the inverter 1 when the inverter 1 operates in a network construction control manner can be quickly adjusted, and the inverter 1 can operate in a voltage source mode. Because the inverter 1 operates in the voltage source mode, the inverter 1 can further provide voltage and frequency support for the alternating current power grid without a delay. In addition, when operating in the voltage source mode, the inverter 1 may further implement a fast power scheduling response, so that the output power of the photovoltaic module is stable at a non-maximum power point, and output power of the inverter 1 is stable.

The controller 13 may control the output voltage of the inverter circuit 12 in a manner of superimposing the output voltage frequency variation $\Delta w$ on the output voltage reference frequency $w_{ref}$, so that actual output active power when the inverter 1 operates in a network construction control manner can be quickly controlled, and the inverter 1 can operate in a voltage source mode. Because the inverter 1 operates in the voltage source mode, the inverter 1 can further provide voltage and frequency support for the alternating current power grid without a delay. In addition, when the inverter 1 operates in the voltage source mode, the inverter 1 may further consider an MPPT scenario or a fast response scenario of a power scheduling instruction. Therefore, the inverter 1 has strong applicability.

Figure 12:
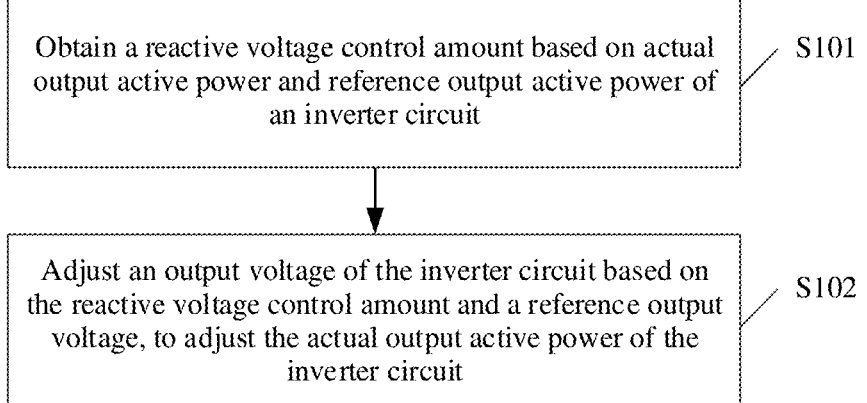
FIG. 12 is a schematic flowchart of a control method for an inverter.

FIG. 12 is a schematic flowchart of a control method for an inverter. The control method for an inverter provided in this embodiment is applicable to the inverter 1 shown in FIG. 2, FIG. 3, FIG. 7, FIG. 8, and FIG. 11. The control method for an inverter may include the following steps.

S101: Obtain a reactive voltage control amount based on actual output active power and reference output active power of an inverter circuit.

In an optional implementation, after the inverter operates, the inverter obtains an actual bus voltage of a direct current bus when a direct current conversion circuit is in an MPPT working state and obtains the reference output active power of the inverter circuit based on the actual bus voltage and a reference bus voltage of the direct current bus. Then, the inverter obtains the reactive voltage control amount based on the actual output active power and the reference output active power of the inverter circuit.

In another optional implementation, after the inverter operates, when receiving a power scheduling instruction, the inverter determines first power carried in the power scheduling instruction as the reference output active power of the inverter circuit and obtains the reactive voltage control amount based on the reference output active power and the actual output active power of the inverter circuit.

S102: Adjust an output voltage of the inverter circuit based on the reactive voltage control amount and a reference output voltage, to adjust the actual output active power of the inverter circuit.

In an optional implementation, the reactive voltage control amount is a q-axis output voltage variation.

In an optional embodiment, when the q-axis output voltage variation is greater than 0, the inverter adjusts the output voltage of the inverter circuit based on the q-axis output voltage variation and the reference output voltage, to increase the actual output active power of the inverter circuit.

In another optional embodiment, when the q-axis output voltage variation is less than 0, the inverter adjusts the output voltage of the inverter circuit based on the q-axis output voltage variation and the reference output voltage, to decrease the actual output active power of the inverter circuit.

In another optional implementation, the reactive voltage control amount is an output voltage frequency variation.

In an optional embodiment, when a q-axis output voltage variation corresponding to the output voltage frequency variation is greater than 0, the inverter adjusts the output voltage of the inverter circuit based on the output voltage frequency variation and the reference output voltage, to decrease the actual output active power of the inverter circuit.

In another optional embodiment, when a q-axis output voltage variation corresponding to the output voltage frequency variation is less than 0, the inverter adjusts the output voltage of the inverter circuit based on the output voltage frequency variation and the reference output voltage, to increase the actual output active power of the inverter circuit.

In an implementation, for more operations performed by the inverter in the control method for the inverter, refer to implementations performed by the inverter 1 shown in FIG. 2, FIG. 3, FIG. 7, FIG. 8, and FIG. 11. Details are not described herein again.

In the embodiments, the inverter quickly adjusts the included angle between the output voltage vector of the inverter circuit and the voltage vector of the alternating current power grid in an output voltage control manner of superimposing the reactive voltage control amount on the reference output voltage, so that actual output active power of the inverter when the inverter operates in a network construction control manner can be quickly controlled, and the inverter can operate in the voltage source mode. Because the inverter operates in the voltage source mode, the inverter can further provide voltage and frequency support for the alternating current power grid without a delay.

The foregoing descriptions are merely implementations, and are not intended as limiting. Any variation or replacement readily figured out by a person skilled in the art shall fall within the scope of the embodiments.

What is claimed is:

1. An inverter system comprising:
a direct current conversion circuit;
a direct current bus;
an inverter circuit; and
a controller, wherein an input end of the direct current conversion circuit is connected to an input end of the inverter system, an output end of the direct current conversion circuit is connected to an input end of the inverter circuit through the direct current bus, and an output end of the inverter circuit is connected to an output end of the inverter system; and
the controller is configured to:
obtain a reactive voltage control amount based on actual output active power and reference output active power of the inverter circuit, and
adjust an output voltage of the inverter circuit based on the reactive voltage control amount and a reference output voltage, to adjust the actual output active power of the inverter circuit based on a sign of a q-axis output voltage variation, wherein the reactive voltage control amount is the q-axis output voltage variation or an output voltage frequency variation, the q-axis output voltage variation corresponding to the output voltage frequency variation.

2. The inverter system according to claim 1, wherein the controller is further configured to:
obtain an actual bus voltage of the direct current bus when the direct current conversion circuit is in a maximum power point tracking working state, and
obtain the reference output active power of the inverter circuit based on the actual bus voltage and a reference bus voltage.

3. The inverter system according to claim 1, wherein the controller is further configured to:
when the inverter system receives a power scheduling instruction, determine first power carried in the power scheduling instruction as the reference output active power of the inverter circuit.

4. The inverter system according to claim 1, wherein the controller is further configured to:
when the q-axis output voltage variation is greater than 0, adjust the output voltage of the inverter circuit based on the q-axis output voltage variation and the reference output voltage, to increase the actual output active power of the inverter circuit.

5. The inverter system according to claim 4, wherein the reference output voltage comprises a q-axis reference output voltage component, a d-axis reference output voltage component, and an output voltage reference frequency; and
the controller is further configured to:
obtain a q-axis target output voltage component based on the q-axis reference output voltage component and the q-axis output voltage variation, and
adjust the output voltage of the inverter circuit based on the q-axis target output voltage component, the output voltage reference frequency, and the d-axis reference output voltage component.

6. The inverter system according to claim 1, wherein the controller is further configured to:
when the q-axis output voltage variation is less than 0, adjust the output voltage of the inverter circuit based on the q-axis output voltage variation and the reference output voltage, to decrease the actual output active power of the inverter circuit.

7. The inverter system according to claim 1, wherein the reactive voltage control amount is an output voltage frequency variation; and the controller is further configured to:

when the q-axis output voltage variation corresponding to the output voltage frequency variation is greater than 0, adjust the output voltage of the inverter circuit based on the output voltage frequency variation and the reference output voltage, to decrease the actual output active power of the inverter circuit.

8. The inverter system according to claim 7, wherein the reference output voltage comprises a q-axis reference output voltage component, a d-axis reference output voltage component, and an output voltage reference frequency; and the controller is further configured to:

obtain an output voltage target frequency based on the output voltage reference frequency and the output voltage frequency variation, and adjust the output voltage of the inverter circuit based on the output voltage target frequency, the q-axis reference output voltage component, and the d-axis reference output voltage component.

9. The inverter system according to claim 1, wherein the reactive voltage control amount is an output voltage frequency variation; and the controller is further configured to:

when the q-axis output voltage variation corresponding to the output voltage frequency variation is less than 0, adjust the output voltage of the inverter circuit based on the output voltage frequency variation and the reference output voltage, to increase the actual output active power of the inverter circuit.

10. The inverter system according to claim 1, wherein the controller controls such that an absolute value of a difference between the actual output active power of the inverter circuit and the reference output active power is less than a preset difference threshold.

11. A method for an inverter system, wherein the inverter system comprises a direct current conversion circuit, a direct current bus, and an inverter circuit, an input end of the direct current conversion circuit is connected to an input end of the inverter system, an output end of the direct current conversion circuit is connected to an input end of the inverter circuit through the direct current bus, and an output end of the inverter circuit is connected to an output end of the inverter system; and the method comprises:

obtaining a reactive voltage control amount based on actual output active power and reference output active power of the inverter circuit; and adjusting an output voltage of the inverter circuit based on the reactive voltage control amount and a reference output voltage, to adjust the actual output active power of the inverter circuit based on a sign of a q-axis output voltage variation, wherein the reactive voltage control amount is the q-axis output voltage variation or an output voltage frequency variation, the q-axis output voltage variation corresponding to the output voltage frequency variation.

12. The method according to claim 11, further comprising:

obtaining an actual bus voltage of the direct current bus when the direct current conversion circuit is in a maximum power point tracking working state; and obtaining the reference output active power of the inverter circuit based on the actual bus voltage and a reference bus voltage.

13. The method according to claim 11, further comprising:

when the inverter system receives a power scheduling instruction, determining a first power carried in the power scheduling instruction as the reference output active power of the inverter circuit.

14. The method according to claim 11, wherein adjusting the output voltage of the inverter circuit based on the reactive voltage control amount and the reference output voltage further comprises:

when the q-axis output voltage variation is greater than 0, adjusting the output voltage of the inverter circuit based on the q-axis output voltage variation and the reference output voltage, to increase the actual output active power of the inverter circuit.

15. The method according to claim 11, wherein adjusting the output voltage of the inverter circuit based on the reactive voltage control amount and the reference output voltage further comprises:

when the q-axis output voltage variation is less than 0, adjusting the output voltage of the inverter circuit based on the q-axis output voltage variation and the reference output voltage, to decrease the actual output active power of the inverter circuit.

16. The method according to claim 11, wherein the reference output voltage comprises a q-axis reference output voltage component, a d-axis reference output voltage component, and an output voltage reference frequency; and adjusting the output voltage of the inverter circuit based on the q-axis output voltage variation and the reference output voltage further comprises:

obtaining a q-axis target output voltage component based on the q-axis reference output voltage component and the q-axis output voltage variation, and adjusting the output voltage of the inverter circuit based on the q-axis target output voltage component, the d-axis reference output voltage component, and the output voltage reference frequency.

17. The method according to claim 11, wherein the reactive voltage control amount is an output voltage frequency variation; and adjusting the output voltage of the inverter circuit based on the reactive voltage control amount and the reference output voltage further comprises:

when the q-axis output voltage variation corresponding to the output voltage frequency variation is greater than 0, adjusting the output voltage of the inverter circuit based on the output voltage frequency variation and the reference output voltage, to decrease the actual output active power of the inverter circuit.

18. The method according to claim 17, wherein the reference output voltage comprises a q-axis reference output voltage component, a d-axis reference output voltage component, and an output voltage reference frequency; and adjusting the output voltage of the inverter circuit based on the output voltage frequency variation and the reference output voltage further comprises:

obtaining an output voltage target frequency based on the output voltage reference frequency and the output voltage frequency variation, and adjusting the output voltage of the inverter circuit based on the output voltage target frequency, the q-axis reference output voltage component, and the d-axis reference output voltage component.

19. The method according to claim 11, wherein the reactive voltage control amount is an output voltage frequency variation; and adjusting the output voltage of the inverter circuit based on the reactive voltage control amount and the reference output voltage further comprises:

when the q-axis output voltage variation corresponding to the output voltage frequency variation is less than 0, adjusting the output voltage of the inverter circuit based on the output voltage frequency variation and the reference output voltage, to increase the actual output active power of the inverter circuit.

20. The method according to claim 11, further comprising controlling the inverter system such that an absolute value of a difference between the actual output active power of the inverter circuit and the reference output active power is less than a preset difference threshold.

\* \* \* \* \*